United States Patent
Park et al.

(10) Patent No.: US 10,763,618 B2
(45) Date of Patent: Sep. 1, 2020

(54) APPARATUS FOR EMERGENCY DISCONNECTION OF BATTERY CHARGE INLET OF ELECTRIC VEHICLE

(71) Applicants: HYUNDAI MOTOR COMPANY, Seoul (KR); KIA MOTORS CORPORATION, Seoul (KR); YURA CORPORATION CO., LTD., Seongnam-si, Gyeonggi-do (KR)

(72) Inventors: Seong-Cheol Park, Seongnam-si (KR); Woo-Won Jung, Osan-si (KR); Seong-Jae Lee, Osan-si (KR)

(73) Assignees: Hyundai Motor Company, Seoul (KR); Kia Motors Corporation, Seoul (KR); Yura Corporation Co., Ltd., Seongnam, Gyeonggi-do (KR)

( * ) Notice: Subject to any disclaimer, the term of this patent is extended or adjusted under 35 U.S.C. 154(b) by 0 days.

(21) Appl. No.: 16/435,964

(22) Filed: Jun. 10, 2019

(65) Prior Publication Data

US 2020/0185861 A1 Jun. 11, 2020

(30) Foreign Application Priority Data

Dec. 11, 2018 (KR) .................. 10-2018-0159367

(51) Int. Cl.
```
H01R 13/62     (2006.01)
H01R 13/633    (2006.01)
H01R 13/627    (2006.01)
B60L 53/16     (2019.01)
```
(52) U.S. Cl.
CPC ......... *H01R 13/6335* (2013.01); *B60L 53/16* (2019.02); *H01R 13/6272* (2013.01); *H01R 2201/26* (2013.01)

(58) Field of Classification Search
CPC ........... H01R 13/6335; H01R 13/6272; H01R 2201/26; B60L 53/16
USPC ........................................ 439/159, 160, 923
See application file for complete search history.

(56) References Cited

U.S. PATENT DOCUMENTS

| | | | | |
|---|---|---|---|---|
| 2,853,690 A | * | 9/1958 | Madison | H01R 13/627 439/155 |
| 2,955,273 A | * | 10/1960 | Winkler | H01R 13/635 439/153 |
| 3,182,877 A | * | 5/1965 | Slator | E21B 19/22 226/172 |
| 3,536,876 A | * | 10/1970 | Lastinger | H01R 11/282 200/51 R |

(Continued)

FOREIGN PATENT DOCUMENTS

| | | |
|---|---|---|
| JP | 2011-229268 A | 11/2011 |
| KR | 10-2016-0000285 A | 1/2016 |
| KR | 10-2016-0052286 A | 5/2016 |

*Primary Examiner* — Abdullah A Riyami
*Assistant Examiner* — Vladimir Imas
(74) *Attorney, Agent, or Firm* — Mintz Levin Cohn Ferris Glovsky and Popeo, P.C.; Peter F. Corless (57) ABSTRACT

An apparatus for emergency disconnection of a battery charge inlet of an electric vehicle may include a case; a handle mounted in the case, and rotatable by partially exposing through a groove formed at one side of the case; and an emergency disconnection cable having one side connected to the handle, and having the other side connected to an emergency disconnection lever provided in an inlet actuator mounted on the inlet for charging an electric vehicle.

7 Claims, 6 Drawing Sheets

(56) References Cited

U.S. PATENT DOCUMENTS

| | | | | |
|---|---|---|---|---|
| 3,692,965 | A * | 9/1972 | Gardner | H01H 9/285 200/43.07 |
| 3,814,876 | A * | 6/1974 | Biafore | H01H 13/18 200/61.58 R |
| 4,045,106 | A * | 8/1977 | Borg | H01R 13/635 439/152 |
| 4,054,104 | A * | 10/1977 | Haselton | B63B 35/4406 114/264 |
| 4,095,421 | A * | 6/1978 | Silcox | E21B 33/0355 137/236.1 |
| 4,114,969 | A * | 9/1978 | Borg | H01R 13/635 439/160 |
| 4,421,373 | A * | 12/1983 | Ratchford | H01R 13/5219 439/152 |
| 4,605,271 | A * | 8/1986 | Burns | H01R 13/6276 439/160 |
| 4,907,981 | A * | 3/1990 | Gallusser | H01R 13/6276 439/258 |
| 4,943,187 | A * | 7/1990 | Hopper | B63C 11/52 166/338 |
| 5,211,569 | A * | 5/1993 | Havens | H01R 13/635 439/159 |
| 5,315,064 | A * | 5/1994 | Andrews | H01R 13/633 174/40 R |
| 5,344,331 | A * | 9/1994 | Hoffman | H01R 13/453 439/138 |
| 5,480,313 | A * | 1/1996 | d'Alayer de Costemore d'Arc | H01R 13/635 439/159 |
| 5,725,399 | A * | 3/1998 | Albiez | B60K 28/14 439/762 |
| 6,953,356 | B2 * | 10/2005 | Hisamatsu | H01R 13/6273 439/258 |
| 7,044,759 | B2 * | 5/2006 | Hughes | B60R 19/48 439/180 |
| 7,165,619 | B2 * | 1/2007 | Fox | E21B 7/124 166/343 |
| 8,376,768 | B2 * | 2/2013 | Kurumizawa | B60L 53/65 439/304 |
| 8,857,520 | B2 * | 10/2014 | Hoffman | E21B 33/038 166/338 |
| 8,922,049 | B2 * | 12/2014 | Holland | B60L 58/15 307/9.1 |
| 8,963,481 | B2 * | 2/2015 | Prosser | B60L 53/57 320/104 |
| 9,156,363 | B2 * | 10/2015 | Nakajima | B60L 53/16 |
| 9,178,312 | B2 * | 11/2015 | Nakajima | H01R 13/639 |
| 9,197,012 | B2 * | 11/2015 | Nakajima | H01R 13/6275 |
| 9,243,874 | B1 * | 1/2016 | Bitar | F41H 11/30 |
| 9,393,933 | B2 * | 7/2016 | Straugheir | B60R 25/20 |
| 9,419,288 | B2 * | 8/2016 | Wood | E21B 33/064 |
| 9,437,966 | B2 * | 9/2016 | Gagne | H01R 13/635 |
| 9,685,734 | B1 * | 6/2017 | Nugent, Jr. | B60L 53/16 |
| 9,929,490 | B1 * | 3/2018 | Anderson | H01R 13/405 |
| 10,027,058 | B2 * | 7/2018 | Guzeldereli | H01R 13/6271 |
| 10,066,458 | B2 * | 9/2018 | Deacon | E21B 34/02 |
| 10,153,584 | B2 * | 12/2018 | Iwabe | H01R 13/6215 |
| 10,177,497 | B2 * | 1/2019 | Guzeldereli | H01R 13/635 |
| 10,274,532 | B1 * | 4/2019 | Smith | B60R 16/03 |
| 10,442,303 | B2 * | 10/2019 | Lee | B60R 25/305 |
| 10,446,990 | B2 * | 10/2019 | Dykas | H01R 13/633 |
| 2003/0178200 | A1 * | 9/2003 | Fox | E21B 7/124 166/341 |
| 2008/0048140 | A1 * | 2/2008 | Whitby | E21B 33/062 251/1.3 |
| 2012/0313580 | A1 * | 12/2012 | Charnesky | H01R 13/6397 320/109 |

\* cited by examiner

APPARATUS FOR EMERGENCY DISCONNECTION OF BATTERY CHARGE INLET OF ELECTRIC VEHICLE

CROSS-REFERENCE TO RELATED APPLICATION

This application claims priority to Korean Patent Application No. 10-2018-0159367, filed on Dec. 11, 2018, which is incorporated herein by reference in its entirety.

BACKGROUND OF THE DISCLOSURE

Field of the Disclosure

The present disclosure relates to an apparatus for emergency disconnection of the coupling of an inlet and an outlet for charging a battery of an electric vehicle.

Description of Related Art

An electric vehicle is driven by using electricity stored in a battery as a power source. In order to charge a battery, the vehicle has a charger inlet and a charging station has a charger outlet or plug. When charging, the outlet is coupled to the inlet. Korean Patent Laid-Open Publication 10-2016-0000285 and Japanese Patent Laid-Open Publication 2011-229268 disclose the related technology.

The contents described in Description of Related Art are to help the understanding of the background of the present disclosure, and may include what is not previously known to those skilled in the art to which the present disclosure pertains.

SUMMARY OF THE DISCLOSURE

One aspect of the present disclosure provides an apparatus for emergency disconnection of a battery charge inlet of an electric vehicle for emergency disconnection of the outlet coupled to the inlet.

An apparatus for emergency disconnection of a battery charge inlet of an electric vehicle according to one aspect of the present disclosure includes a case, a handle mounted in the case, and rotatable by partially exposing through a groove formed at one side of the case and an emergency disconnection cable having one side connected to the handle, and having the other side connected to an emergency disconnection lever provided in an inlet actuator mounted on the inlet for charging an electric vehicle.

Then, when the handle is rotated, the emergency disconnection cable is pulled, and the emergency disconnection cable rotates the emergency disconnection lever to release the restraint of the outlet coupled to the inlet.

In addition, when the emergency disconnection lever is rotated by the emergency disconnection cable, the protrusion of an actuator pin for restraining the outlet is released by operating to be protruded by the inlet actuator.

Then, the handle returns to the original position by an elastic restoring force when an external force is released after the rotation operation thereof.

In addition, a handle mounting part protruded in a frame shape having a diameter smaller than that of the handle is formed at the inside of the case, the handle is inserted into the handle mounting part, and is rotated in the handle mounting part, and the handle returns after the operation thereof by a plate spring provided in the handle mounting part.

In addition, the plate spring has one side fixed and coupled to a plate spring fixing groove formed in the handle mounting part, and has the other side inserted into a coupling groove formed on a plate sprint coupling part formed to be protruded from the handle, such that the displacement occurs upon rotation of the handle.

Meanwhile, a handle fitting end is formed at one side of the emergency disconnection cable, and the handle fitting end is coupled to one side of the circumference of the handle, such that the handle fitting end is pulled along the rotation direction of the handle upon rotation of the handle.

According to the apparatus for emergency disconnection of the battery charge inlet of the electric vehicle according to the present disclosure, it is possible for a user to easily disconnect the actuator pin of the inlet actuator by the emergency disconnection cable by the handle operation, thereby easily disconnecting the outlet in emergency.

In addition, it is possible to return the emergency disconnection cable to the original position automatically after the outlet is disconnected by the handle operation.

DESCRIPTION OF EMBODIMENTS

In order to fully understand the present disclosure, operational advantages of the present disclosure, and objects achieved by the practice of the present disclosure, reference should be made to the accompanying drawings exemplifying the preferred embodiments of the present disclosure and the contents illustrated in the accompanying drawings.

In describing the preferred embodiments of the present disclosure, a description of known or repeated descriptions that may unnecessarily obscure the subject matter of the present disclosure will be reduced or omitted.

Figure 1:
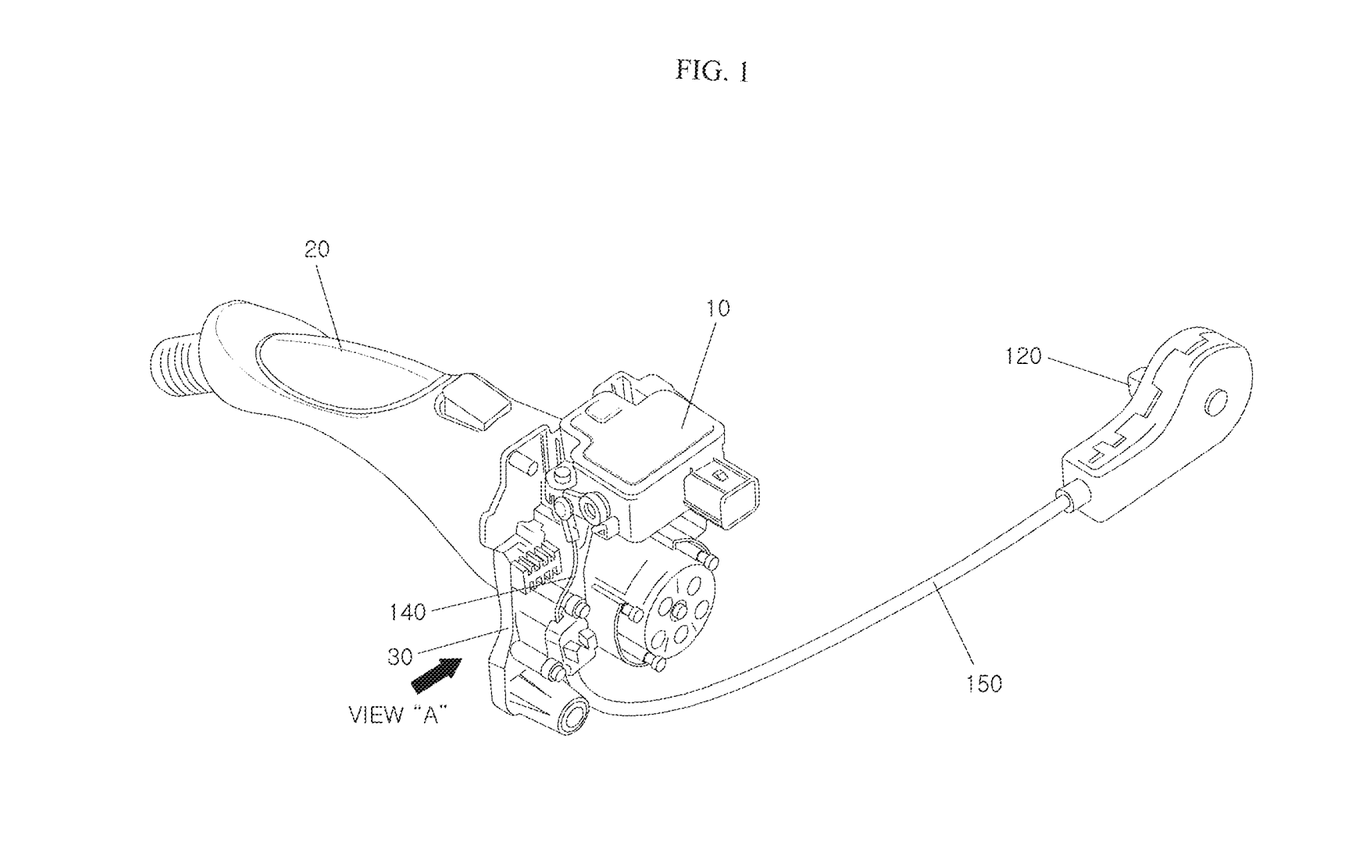
FIG. 1 is a diagram illustrating an apparatus for emergency disconnection of a battery charge inlet of an electric vehicle according to the present disclosure, showing that a charging outlet is coupled to a charging inlet.
Figure 2:
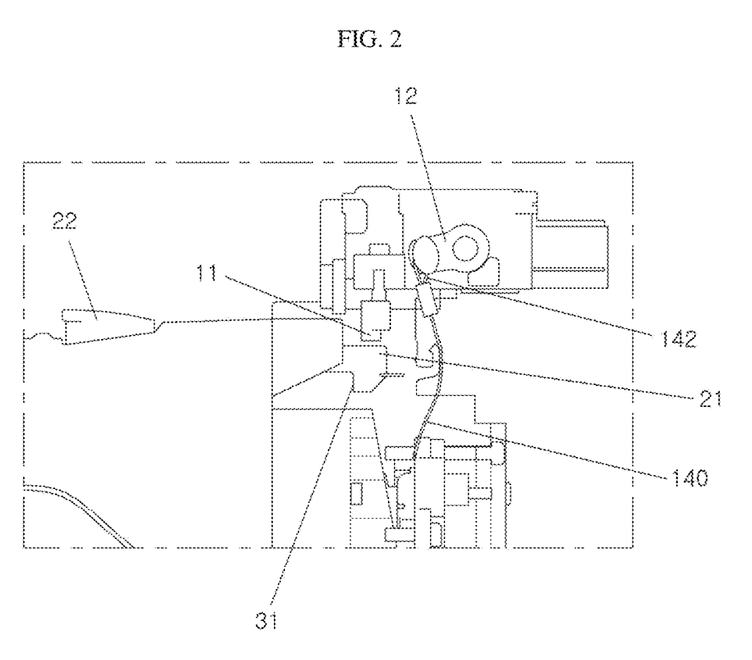
FIG. 2 is an enlarged diagram of the portion A of FIG. 1.
Figure 3:
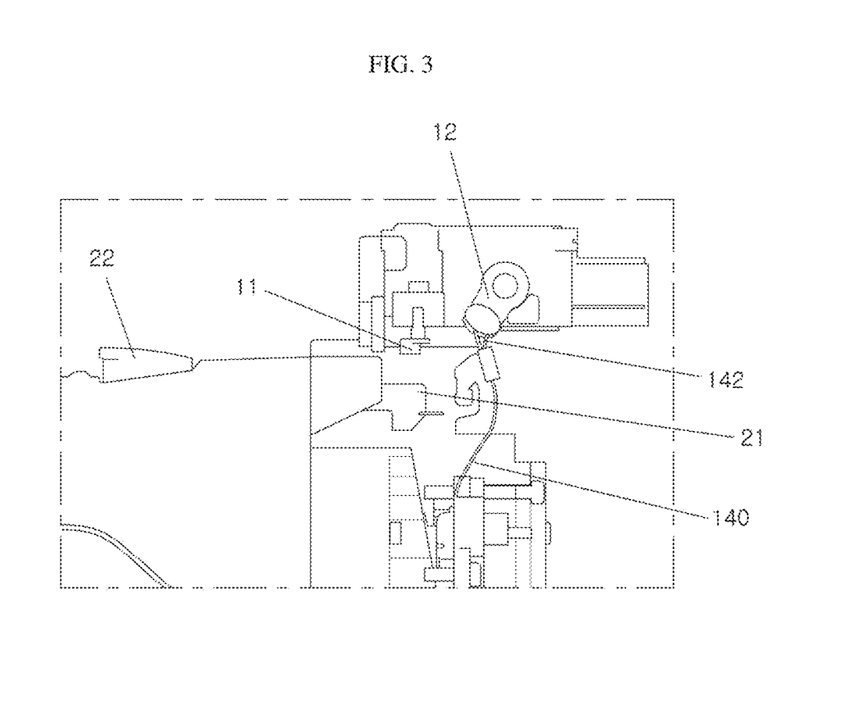
FIG. 3 is a diagram illustrating the portion A upon an operation of the apparatus for emergency disconnection of the battery charge inlet of the electric vehicle according to the present disclosure.

FIG. 1 is a diagram illustrating an apparatus for emergency disconnection of a battery charge inlet of an electric vehicle according to the present disclosure, FIG. 2 is an enlarged diagram of the portion A of FIG. 1, and FIG. 3 is a diagram illustrating the portion A upon an operation of the apparatus for emergency disconnection of the battery charge inlet of the electric vehicle according to the present disclosure.

Referring FIGS. 1 and 2, for providing stability of the coupling between the inlet and the outlet, a fastening locking means as illustrated in FIGS. 1 and 2 may be provided therein.

An outlet or charging plug 20 has a locking end 21 formed thereon. An inlet or charging inlet 30 has a locking protrusion 31 so that the locking end 21 is locked or engaged with the locking protrusion 31 in order to inhibit the outlet from retracting in a retreating direction when the outlet 20 is fastened to or engaged with the inlet 30. Further, for providing the physical safety thereof, an actuator pin 11 is protruded downwardly to press the locking end 21 of the outlet 20 by an operation of an inlet actuator 10 provided in the inlet 30.

When an outlet disconnecting lever 22 integrally formed with the locking end 21 is pressed in order to disconnect the coupling of the outlet 20, the locking end 21 pushes the actuator pin 11 upwardly by rotating around a rotation axis for allowing the outlet 20 to retract from the inlet.

The outlet should quickly be disconnected for the emergency situations such as theft, emergency, and safety. However, when malfunction of the inlet actuator or the like occurs, it is possible that the outlet is not properly disconnected.

Hereinafter, an apparatus for emergency disconnection of a battery charge inlet of an electric vehicle according to an embodiment of the present disclosure will be described with reference to FIGS. 1 to 3.

An apparatus for emergency disconnection of a battery charge inlet of an electric vehicle according to the present disclosure is an apparatus for emergency disconnection of the coupling in a state where the inlet 30 configured in an electric vehicle and the outlet 20 for charge have been connected.

The inlet 30 and the outlet 20 are coupled to be electrically connected to each other, and after fastening or engaging, the locking end 21 formed on the outlet 20 is locked by the locking protrusion 31 formed on the inlet 30 in order to inhibit the charging plug 20 from moving in the retreating direction.

In addition, for the physical safety thereof, the actuator pin 11 is protruded downwardly to lock by pressing the locking end 21 of the outlet 20 by an operation of the inlet actuator 10 provided in the inlet 30.

In embodiments, when the outlet disconnection lever 22 integrally formed with the locking end 21 is pressed in order to disconnect the coupling of the outlet 20, the locking end 21 pushes the actuator pin 11 upwardly by rotating around a rotation axis to retreat the outlet 20.

In embodiments, the emergency disconnection lever 12 is provided in the inlet actuator 10 for emergency disconnection of the outlet 20 and the inlet 30 as shown in FIG. 2. When the emergency disconnection lever 12 is rotated as in FIG. 3, the actuator pin 11 is moved in order not to press the locking end 21 of the outlet 20 anymore.

The rotation operation of the emergency disconnection lever 12 is operated by pulling an emergency disconnection cable 140 connected thereto, and a handle 120 is provided for pulling the emergency disconnection cable 140.

Figure 4:
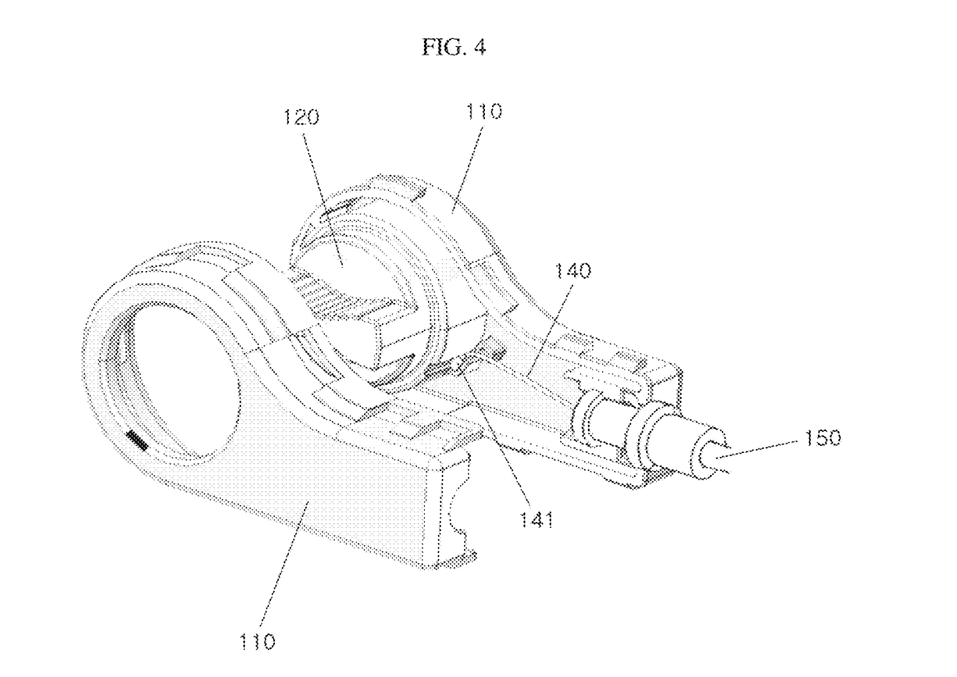
FIGS. 4 to 6 are partially exploded diagrams of the internal configuration of apparatus for emergency disconnection of the battery charge inlet of the electric vehicle according to the present disclosure.
Figure 5:
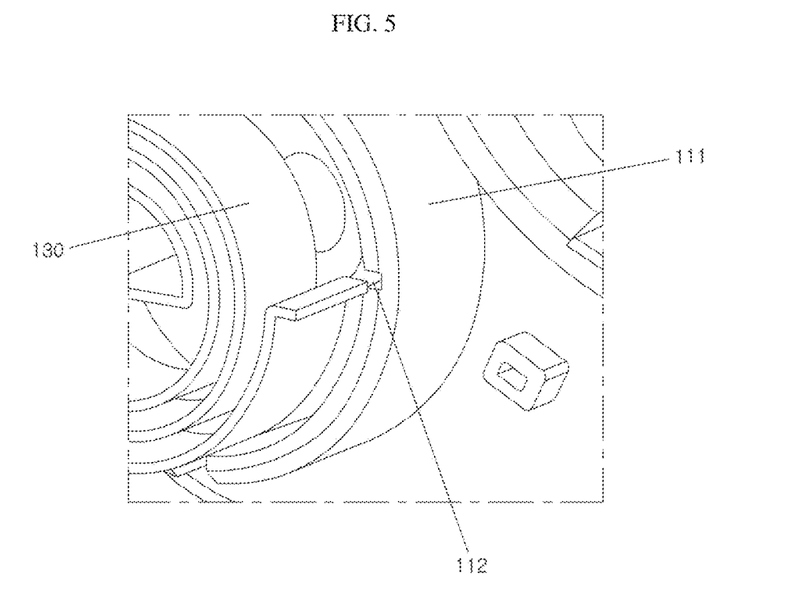
Figure 6:
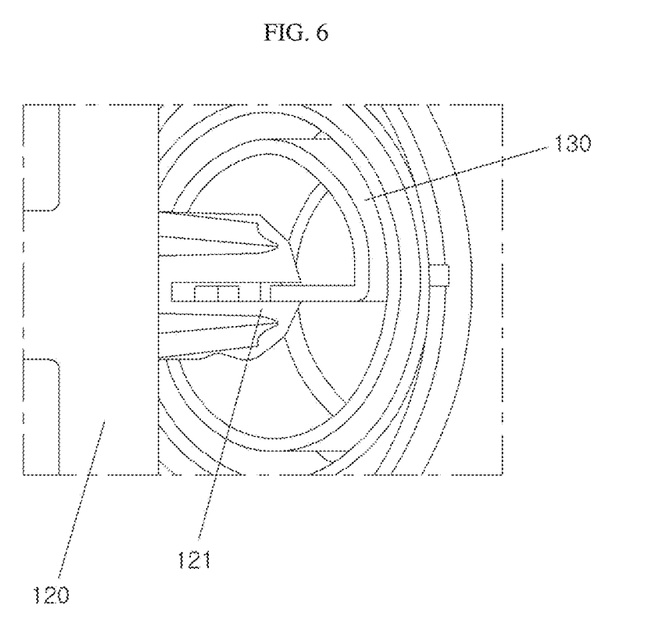

Referring to FIGS. 4 to 6, the handle 120 of the apparatus for emergency disconnection of the battery charge inlet of the electric vehicle of the present disclosure is coupled to a case 110, and includes a plate spring or spiral torsion spring (e.g., clock mainspring) 130, an emergency disconnection cable 140, and a cable pipe 150 for covering and protecting the emergency disconnection cable 140.

As illustrated in FIG. 4, in embodiments, the case 110 includes two pieces that are configured to be divided and assembled, and has a handle mounting part 111, which is protruded in a frame shape having a diameter smaller than the diameter of the handle 120, formed in a cavity of one side case, and the handle 120 is inserted into the handle mounting part 111 to be rotatable in the handle mounting part 111.

The other side case has a hole for protruding the handle 120 to the outside of the case.

In embodiments, a plate spring fixing groove 112 is formed in the handle mounting part 111 so that one side of a plate spring 130 is inserted into and fixed to the plate spring fixing groove 112.

The plate spring 130 is disposed inside the inner circumference of the handle 120, and the overall diameter thereof is smaller than the inner diameter of the handle 120, and the other side of the plate spring 130 is coupled with the handle 120.

For this purpose, a plate spring coupling part 121 is formed to be protruded from the handle 120 as illustrated, and the plate spring 130 is inserted into and coupled to a coupling groove formed in the plate spring coupling part 121.

In embodiments, when the handle 120 is rotated, the plate spring 130 is also shrunk and displaced, and when the external force applied to the handle 120 is released, the plate spring 130 returns to the original state by the elastic restoring force, such that the handle 120 are again disposed to the original position.

The emergency disconnection cable 140 has one side connected to the handle 120 and has the other side connected to the emergency disconnection lever 12, such that when the emergency disconnection cable 140 is pulled by the handle 120, the emergency disconnection cable 140 pulls the emergency disconnection lever 12 to rotate.

An end 141 of the cable 140 is fixed to the handle 120 side. The end 141 is coupled to a portion of the circumference of the handle 120.

Figure 7:
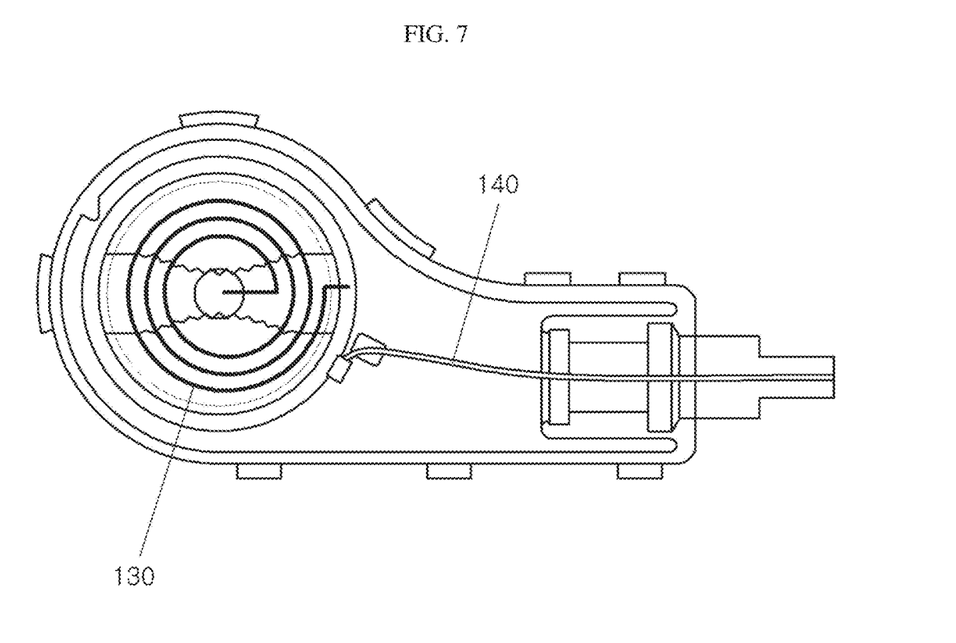
FIGS. 7 and 8 are projection diagrams for explaining the operation of apparatus for emergency disconnection of the battery charge inlet of the electric vehicle according to the present disclosure.
Figure 8:
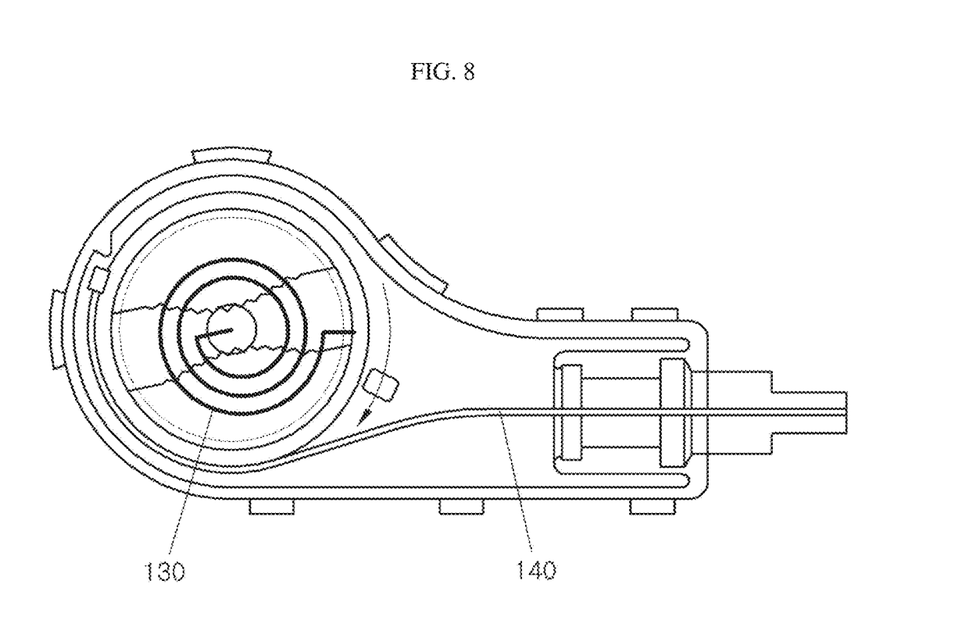

When the handle 120 is rotated from a state shown in FIG. 7 to a state as illustrated in FIG. 8, the plate spring 130 is shrunk and deformed and the end 141 is rotated along the rotation direction of the handle 120, such that the emergency disconnection cable 140 is pulled.

A hook 142 is formed at the other side of the emergency disconnection cable 140, such that the hook 142 is coupled by being hooked on the emergency disconnection lever 12.

As described above, the apparatus for emergency disconnection of the battery charge inlet of the electric vehicle of the present disclosure may easily operate the emergency disconnection lever of the inlet actuator to release the outlet restraint state of the actuator pin by the operation of the emergency disconnection lever, thereby easily disconnecting the coupling of the inlet and the outlet.

In embodiments, a vehicle includes a battery charging inlet that is to be engaged with a batter charging plug. A locking mechanism is provided to secure the engagement of the inlet and the plug. For an emergency situation, the inlet include a disconnection triggering mechanism. In embodiments, the inlet includes an actuator which include an actuator pin which is capable of moving toward locking mechanism for securing the engagement of the outlet or plug and the inlet. The inlet further includes a lever, a cable and a handle which are parts of the disconnection triggering mechanism. The cable has one end coupled to the lever and the other end coupled to the handle. The handle is retained in a housing along with a spring that applies resilient force to the handle. When the handle rotates, the cable is pulled and the lever rotates to move the actuator pin.

As described above, while the present disclosure has been described with reference to the exemplary drawings, it is not limited to the described embodiments, and it is to be understood by those skilled in the art that various modifications and deformations may be made without departing from the spirit and the scope of the present disclosure. Therefore, the modified examples or the deformed examples should be included in the claims of the present disclosure, and the scope of the present disclosure should be construed based on the appended claims.

What is claimed is:

1. An apparatus for emergency disconnection of a battery charge inlet of an electric vehicle, comprising:
    a case;
    a handle mounted in the case, and rotatable by partially exposing through a hole formed at one side of the case; and
    an emergency disconnection cable having a first end connected to the handle, and having a second end connected to an emergency disconnection lever provided in an inlet actuator mounted on the inlet,
    wherein the handle is configured to rotate and connected to the emergency disconnection cable such that when the handle rotates, the emergency disconnection cable is pulled, and the emergency disconnection cable rotates the emergency disconnection lever to release locking between an outlet and the inlet.

2. The apparatus for emergency disconnection of the battery charge inlet of the electric vehicle of claim 1,
    wherein when the emergency disconnection lever is rotated by the emergency disconnection cable, the protrusion of an actuator pin for restraining the outlet is released by operating to be protruded by the inlet actuator.

3. The apparatus for emergency disconnection of the battery charge inlet of the electric vehicle of claim 1,
    wherein the handle returns to the original position by an elastic restoring force when an external force is released after the rotation operation thereof.

4. The apparatus for emergency disconnection of the battery charge inlet of the electric vehicle of claim 3,
    wherein a handle mounting part protruded in a frame shape having a diameter smaller than that of the handle is formed at the inside of the case,
    wherein the handle is inserted into the handle mounting part, and is rotated in the handle mounting part, and
    wherein the handle is configured to return after the operation thereof by a plate spring provided in the handle mounting part.

5. The apparatus for emergency disconnection of the battery charge inlet of the electric vehicle of claim 4,
    wherein the plate spring has one side fixed and coupled to a plate spring fixing groove formed in the handle mounting part, and has the other side inserted into a coupling groove formed on a plate sprint coupling part formed to be protruded from the handle, such that the displacement occurs upon rotation of the handle.

6. The apparatus for emergency disconnection of the battery charge inlet of the electric vehicle of claim 1,
    wherein a handle of the cable is coupled to one side of the circumference of the handle, such that the end is pulled along the rotation direction of the handle upon rotation of the handle.

7. A charging inlet of a vehicle comprising the apparatus of claim 1.

* * * * *